(12) United States Patent
Schoemer et al.

(10) Patent No.: US 10,183,613 B2
(45) Date of Patent: Jan. 22, 2019

(54) PROJECTION LAMP FOR ILLUMINATION

(71) Applicant: OSRAM GmbH, Munich (DE)

(72) Inventors: Ricarda Schoemer, Zusmarshausen (DE); Juergen Hager, Herbrechtingen (DE); Stephan Schwaiger, Ulm (DE); Oliver Hering, Niederstotzingen (DE); Norbert Haas, Langenau (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/497,251

(22) Filed: Apr. 26, 2017

(65) Prior Publication Data

US 2017/0334338 A1  Nov. 23, 2017

(30) Foreign Application Priority Data

May 19, 2016 (DE) ........................ 10 2016 208 610

(51) Int. Cl.
| | | |
|---|---|---|
| *F21V 11/00* | (2015.01) | |
| *B60Q 1/14* | (2006.01) | |
| *F21S 41/14* | (2018.01) | |
| *F21S 41/20* | (2018.01) | |
| *F21S 41/663* | (2018.01) | |
| *F21S 41/675* | (2018.01) | |
| *F21S 41/686* | (2018.01) | |
| *F21S 41/692* | (2018.01) | |
| *F21S 41/16* | (2018.01) | |

(52) U.S. Cl.
CPC ................ *B60Q 1/14* (2013.01); *F21S 41/14* (2018.01); *F21S 41/16* (2018.01); *F21S 41/285* (2018.01); *F21S 41/663* (2018.01); *F21S 41/675* (2018.01); *F21S 41/686* (2018.01); *F21S 41/692* (2018.01)

(58) Field of Classification Search
USPC .................................................. 362/510, 509
See application file for complete search history.

(56) References Cited

FOREIGN PATENT DOCUMENTS

| | | |
|---|---|---|
| DE | 102008022795 A1 | 11/2009 |
| DE | 102014017521 A1 | 6/2016 |
| WO | 2013164276 A1 | 11/2013 |

*Primary Examiner* — Vip Patel
(74) *Attorney, Agent, or Firm* — Viering Jentschura & Partner MBB

(57) ABSTRACT

A projection lamp for illumination includes a pump radiation unit configured to emit pump radiation, a phosphor element for the at least partial conversion of the pump radiation into a conversion light, and a micromirror array having a multiplicity of micromirror actuators which are arranged in the form of a matrix. The projection lamp is set up such that, during operation, the phosphor element is irradiated by the pump radiation from the pump radiation unit. The conversion light which is thereupon emitted by the phosphor element at least partially makes up an illumination light, which illumination light is guided for adjusting a light distribution over the micromirror actuators. The micromirror actuators are illuminated inhomogeneously with the illumination light at respective times to support the light distribution that is adjusted using the micromirror array.

16 Claims, 5 Drawing Sheets

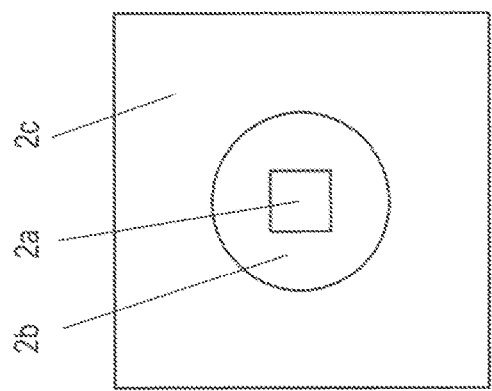
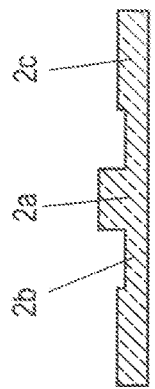
FIG 4A
FIG 4B
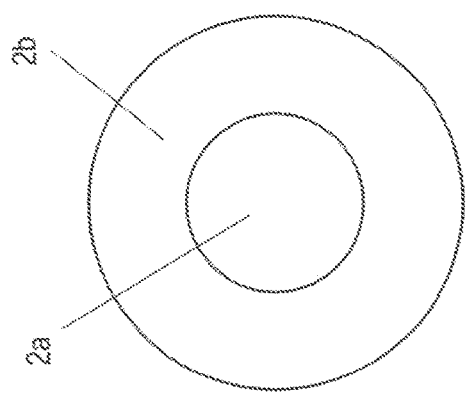
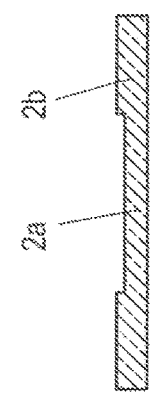
FIG 3A
FIG 3B
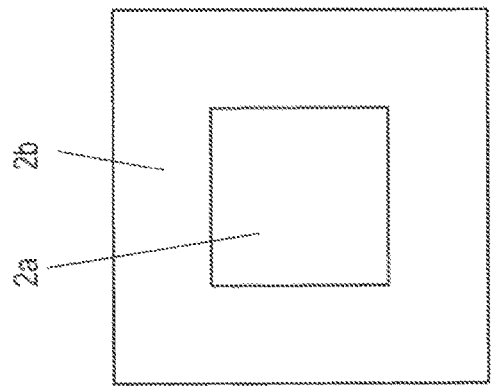
FIG 2A
FIG 2B

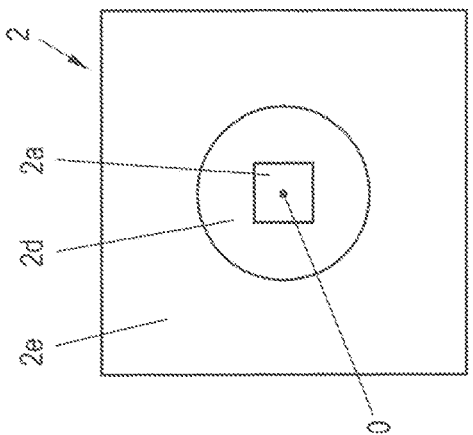
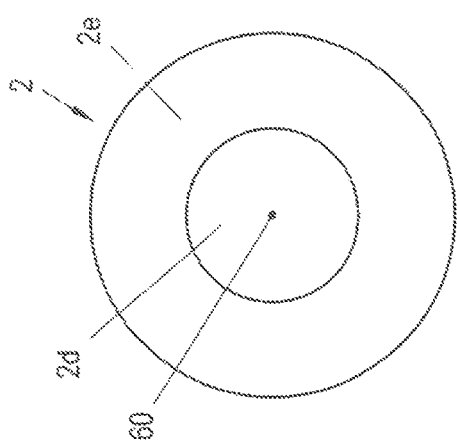
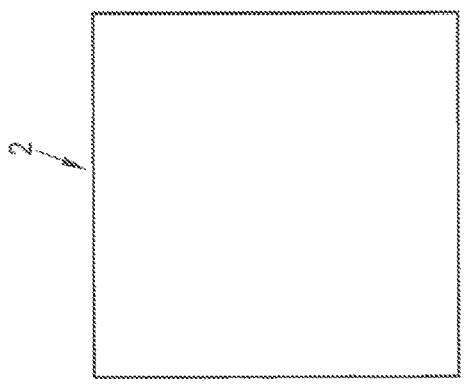
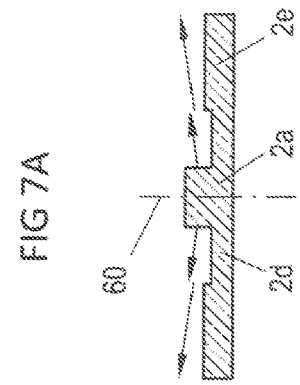

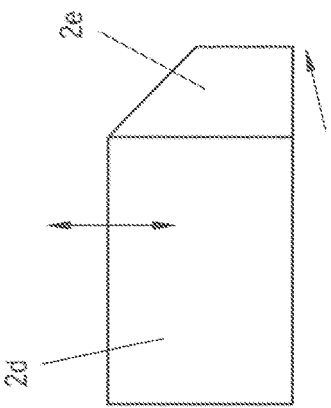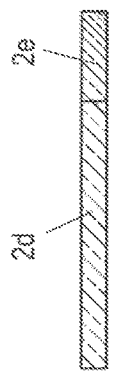
FIG 8A
FIG 8B
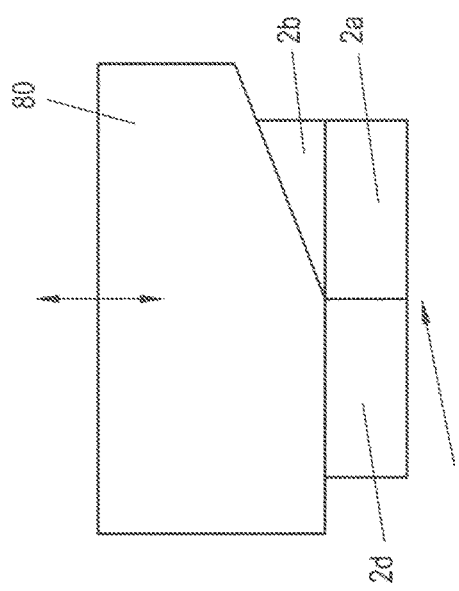
FIG 9A
FIG 9B

PROJECTION LAMP FOR ILLUMINATION

CROSS-REFERENCE TO RELATED APPLICATION

This application claims priority to German Patent Application Serial No. 10 2016 208 610.3, which was filed May 19, 2016, and is incorporated herein by reference in its entirety.

TECHNICAL FIELD

Various embodiments relate generally to a projection lamp having a pump radiation unit for emitting pump radiation and a phosphor element for the at least partial conversion of the pump radiation into conversion light which makes up at least part of an illumination light.

BACKGROUND

The combination of pump radiation unit and phosphor element can be of interest for example in spectral regard; the conversion light can make up the illumination light by itself (full conversion) or in combination with pump radiation which has not been converted in part (partial conversion). In particular in the case of a pump radiation unit of high power density, e.g. a laser, which is arranged at a distance from the phosphor element, it is additionally possible to implement light sources of high luminance, which opens up interesting possibilities in the field of illumination.

SUMMARY

A projection lamp for illumination includes a pump radiation unit configured to emit pump radiation, a phosphor element for the at least partial conversion of the pump radiation into a conversion light, and a micromirror array having a multiplicity of micromirror actuators which are arranged in the form of a matrix. The projection lamp is set up such that, during operation, the phosphor element is irradiated by the pump radiation from the pump radiation unit. The conversion light which is thereupon emitted by the phosphor element at least partially makes up an illumination light, which illumination light is guided for adjusting a light distribution over the micromirror actuators. The micromirror actuators are illuminated inhomogeneously with the illumination light at respective times to support the light distribution that is adjusted using the micromirror array.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 2a to 4b show phosphor elements which are divided into regions of different conversion properties for setting an inhomogeneous illumination of a micromirror array according to FIG. 1a;

FIGS. 5a to 7b show phosphor elements which show conversion properties which vary along a gradient for setting inhomogeneous illumination of a micromirror array according to FIG. 1a;

FIGS. 8a to 9b show further phosphor elements for setting an inhomogeneous illumination of a micromirror array according to FIG. 1a;

FIGS. 10a to 11b show further phosphor elements in connection with an inhomogeneous irradiation with pump radiation for setting an inhomogeneous illumination of a micromirror array according to FIG. 1a.

DESCRIPTION

Figure 1A:
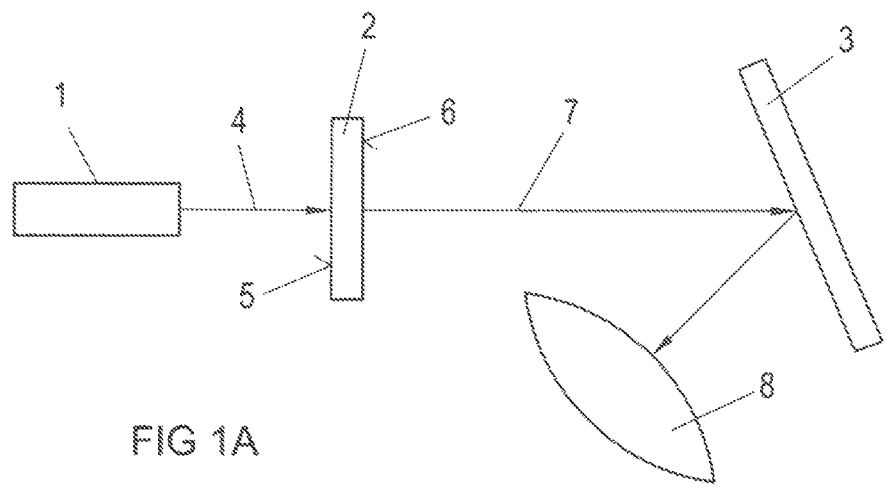
FIG. 1a shows a projection lamp according to various embodiments having a micromirror array in a schematic side view.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments specify a projection lamp having a pump radiation unit and a phosphor element.

According to various embodiments, a projection lamp for illumination is provided, which has:
- a pump radiation unit for emitting pump radiation;
- a phosphor element for the at least partial conversion of the pump radiation into a conversion light;
- a micromirror array having a multiplicity of micromirror actuators which are arranged in the form of a matrix;
- wherein the projection lamp is set up such that, during operation, the phosphor element is irradiated by the pump radiation from the pump radiation unit, wherein the conversion light which is thereupon emitted by the phosphor element at least partially makes up an illumination light which is guided for adjusting a light distribution over the micromirror actuators, wherein the micromirror actuators are illuminated inhomogeneously with the illumination light at respective time points to support the light distribution that is adjusted using the micromirror array.

Various embodiments can be found in the dependent claims and in the entire disclosure, although in the illustration, a distinction is not always drawn specifically between apparatus and method or use aspects; in any event, the disclosure should be read implicitly with respect to all claim categories.

The projection lamp has a micromirror array (also referred to as just "array" below), over which the illumination light is guided, downstream of the phosphor element, for adjusting a light distribution. The micromirror actuators of the array can be driven and tilted at least partially independently from one another, wherein a respective micromirror actuator then directs the illumination light which is guided over it, depending on the tilt position, through an illumination optical system to the illumination application or next to the illumination optical system, for example into an absorber. In the first-mentioned case, the micromirror actuator can be considered to be "switched on" (the illumination light travels from the micromirror actuator to the illumination application), whereas the micromirror actuator in the latter case is "switched off" from the viewpoint of the illumination application (illumination light is not used).

The possibilities of such a projection lamp can be illustrated best by way of a provided use, specifically lighting a street using a motor vehicle projection lamp. The micromirror array is here assigned an illumination optical system such that the illumination light, which is guided by different (switched-on) micromirror actuators through the illumination optical system, travels in different spatial directions, i.e. the light distribution in the position space in the array plane is thus converted into a light distribution in the angle space of the far field. By selectively switching a respective micromirror actuator on/off, it is possible to accordingly supply a respective spatial direction or a solid angle region selectively with illumination light, or not.

It is thus possible to remove solid angle regions in a targeted fashion from the maximum light cone that the projection lamp can achieve, or to add them, which can be used for example for adaptive street illumination. A vehicle, which is for example captured by a camera system of the motor vehicle, is traveling ahead of it or coming toward it, can in this way for example be removed from the light cone in a targeted manner by moving the respectively assigned micromirror actuators into a switched off position (into a corresponding tilt position). This should illustrate a field of use, but without limiting the general concept of the invention.

The light distribution is thus ultimately determined by the matrix-type arrangement of the micromirror actuators in the respective switched-on or switched-off state. The illumination optical system converts this emission pattern, which is two-dimensional in principle, into a corresponding solid angle distribution. However, the light distribution in the projection lamp according to various embodiments is not exclusively set by way of the micromirror array, but a light distribution which is already pre-shaped, as it were, is made available to said micromirror array, specifically by it being illuminated inhomogeneously. The inhomogeneity can be of a spectral nature, with the result that for example one region of the array can be supplied with cold white illumination light and a different region can be supplied with warm white illumination light; the former can then, for example, support a high-beam function, and the latter can support, for example, low beam, fog light and/or daylight running light or other light functions, such as for example a separate city light.

However, the inhomogeneity cannot only be expressed spectrally, but alternatively or additionally also by way of an irradiance that is inhomogeneous over the array. For example, it is possible to already supply micromirror actuators, which are temporarily switched off, with less illumination light or no illumination light at all from the start; in that case, less illumination light within the projection lamp needs to be "destroyed," that is to say e.g. supplied to the absorber (also referred to as "beam dump"), which can offer advantages with respect to energy efficiency. With a reduced power loss, it is also possible to optimize thermal connections, i.e. a smaller heatsink can be provided, for example, which can then offer not only advantages in terms of installation space, but also in terms of weight.

Figuratively speaking, the micromirror array can permit a comparatively finely rasterized adjustable light distribution, wherein this is done according to the invention on the basis of some pre-rasterization. This pre-shaping generally relates to "respective time points," i.e. the illumination of the micromirror array is not observed over the temporal profile (it is of course also possible for there to be a variation here), but the illumination is intended to be inhomogeneous at one time point as a snapshot. In other words, one region of the array is illuminated in one way, for example, and the other region is illuminated differently (or not at all) at the same time.

The "micromirror array" (also: digital micromirror device, DMD) can have, for example, at least 10, 100, 500, 1000, 5000, 10,000 or 30,000 micromirror actuators and (independently thereof) for example no more than $1\times10^8$, $1\times10^7$ or $1\times10^6$ micromirror actuators (in each case with increasing preference in the order of mention). The micromirror actuators are not necessarily switchable completely independently from one another, but can also be grouped together, for example, even already on the chip. It is also possible, for example, for a plurality of micromirror actuators which are arranged next to one another to supply together a solid angle region, or not, and for all of them to be then switched on or off. With respect to specific operating modes, such as for example high beam, low beam, daylight running light etc., a group combination that already exists at the start is also possible.

The conversion may be a down conversion, i.e. the conversion light has a longer wavelength than the pump radiation; the conversion light has at least a predominant proportion in the visible spectral range, and is preferably entirely within the visible range. The conversion light can by itself make up the illumination light (full conversion), but partial conversion is preferred, wherein it makes up the illumination light together with pump radiation which has in part not been converted. The pump radiation is preferably blue light. The illumination light may be white light, whose color space can be for example in a CIE standard color diagram (1931) in the ECE white field according to the ECE/324/Rev. 1/Add.47/Reg.No. 48/Rev. 12.

Where generally the projection lamp "being set up" is mentioned, this means for example that during operation of the projection lamp, the pump radiation/the illumination light propagates accordingly and/or the micromirror array is connected or illuminated accordingly. As far as the beam guidance is concerned, the individual components here are arranged relative to one another such that pump radiation and conversion light or illumination light propagate accordingly. The projection lamp may have a control unit which accordingly controls the switching of the micromirror actuators (switched on/off).

In one embodiment, the micromirror array is illuminated inhomogeneously to the extent that the illumination light is guided to only part of the micromirror actuators, and others remain unilluminated. This concerns the respective time points, that is to say ultimately a specific operating state of the projection lamp; at other respective time points (in a different operating state), it is then also possible to supply for example all micromirror actuators with illumination light or to not supply a different part thereof. For partial switching off of the illumination of the array, it is possible to introduce for example a stop, or it is possible in a pump radiation unit having a plurality of pump radiation sources to effect selective switching off thereof.

The concept of various embodiments, however, can be implemented not just with such a quasi-digital (unilluminated/illuminated) pre-rasterization, but the inhomogeneity can also exist in spectral regard or in the form of an irradiance which varies over the array, cf. the variants which are described in detail below. Combinations are here also expressly possible. It is thus possible, for example, for some of the micromirror actuators not to be illuminated at all and additionally for the irradiance and/or the spectral composition of the illumination light which is guided thereover to differ in the remaining ones.

In one embodiment, the array is illuminated inhomogeneously inasmuch as a first plurality of the micromirror actuators is illuminated with a first part of the illumination light, and a second plurality (which differs from the first one) is illuminated with a second part of the illumination light, wherein the first and the second part have different spectral compositions. The "different spectral compositions" is understood to mean, for example, that two corresponding radiant power spectra with the same scaling (both standardized to a common maximum value $I_{max}$) are not congruent.

Plotted on the X axis over the wavelength in nm, and with linear scaling on the X and Y axis, it is possible in the case of two such spectra having "different spectral compositions" for the respective area under a respective spectrum to deviate from a combination area, which comes about as a combination set of the areas under the spectra, by e.g. at least 1%, 2%, 3%, 4% or 5% (even minor deviations can have a noticeable influence). Generally, the first and second parts of the illumination light can also have different colors, i.e. it is possible for the spectra generally to not overlap at all; however, white light may be provided and the deviations may be small; the deviation from the combination area can be, for example, at most 30%, 25%, 20%, 15% or 10% (in each case with increasing preference in the order of mention).

What may be provided is for both the first and the second part of the illumination light to be white light (e.g. color space in each case within ECE white field) and for the two to differ in terms of their respective color temperatures. Cold white illumination light cannot only provide the above-mentioned high beam, but for example also selectively fulfil a marking function, such that solid angle regions, which are directed for example onto the road side, can be supplied with cold white illumination light, for example to specifically show traffic signs or any possible source of danger, such as for example a wild animal (e.g. a deer) at the road edge.

In one embodiment, the illumination of the micromirror array is inhomogeneous inasmuch as a first part of the illumination light illuminates a first plurality of micromirror actuators and a second part illuminates a second plurality of micromirror actuators (different from the first one), wherein the first and the second part on the array have a different irradiance. For example, the first irradiance may be greater than the second one, in which case for example a central region of a light cone can be supplied via the first plurality of micromirror actuators.

A radiation density (luminance) which has been increased in accordance, for example, with a centrally increased irradiance in that case permits, for example, a very far-reaching finger of light, for example for lighting a straight road at relatively high speed. Notwithstanding the above, it is possible specifically for the first irradiance to be greater than the second irradiance for example by at least 5%, e.g. at least 15% or 25% (possible upper limits can be, independently thereof, for example at most 300%, 200% or 100%).

Generally, the irradiance can also vary over a respective region, and an average formed over the respective region is then taken as the basis for the comparison, with the irradiance in a respective region preferably being constant. The irradiance is observed "on the array," that is to say over a respective reference area which contains the respective micromirror actuators (their reflective surfaces) in an untilted reference state (also referred to as a transient "flat state"), that is to say it is in particular not dependent on the tilt angle of a respective micromirror actuator.

Up until now, it has been the inhomogeneity which the illumination light exhibits on the array per se that has primarily been discussed here, and the following text will focus on different possibilities for setting such an inhomogeneity, e.g. by way of a corresponding configuration of pump radiation unit and/or phosphor element (possibly with interposed stop/filter). Again, the individual measures can be taken as alternatives or in combination. Quite generally, pump radiation sources (e.g. LEDs and/or lasers) can be used to implement inhomogeneous illumination of the array; it is generally also possible, for example, for pump radiation sources of the same radiation density to generate inhomogeneous illumination, for example due to their arrangement or optics, that is to say for them to light areas of different sizes of the phosphor element.

In one embodiment, the pump radiation unit has a plurality of pump radiation sources, and the inhomogeneous irradiation of the array is achieved by way of a first and a second one of the pump radiation sources emitting the pump radiation with different radiation densities. Generally, a pump radiation source can be, for example, an LED (light-emitting diode) or a laser source, e.g. a laser diode. A combination is also expressly possible here, for example the different radiation density can also already have been set by way of an emission characteristic which differs in principle. For example, an LED which typically emits the pump radiation in a manner according to Lambert can provide basic irradiation, wherein a laser then locally modulates thereon a superelevation or subjects a region of the phosphor element which is not irradiated by the LED to a higher irradiance.

Generally, the phosphor element does not necessarily have to be arranged at a distance from the pump radiation unit, but a directly adjoining phosphor element, which is thus in direct optical contact therewith (the pump radiation here does not travel through an optically effective gas volume) is also conceivable e.g. in the case of the LED as the pump radiation source. In any case, in the case of a laser, also e.g. in the case of an LED, a phosphor element that is arranged at a distance from the pump radiation unit may be provided, however, such that the pump radiation therebetween optically effectively travels through a fluid, e.g. a gas volume, e.g. air.

Notwithstanding the above, the phosphor element itself may be irradiated inhomogeneously. The "different" radiation density here relates to differences in the switched-on pump radiation sources; alternatively and/or additionally, a pump radiation source can also be entirely added and removed. Generally, the radiation of the phosphor element may be static inasmuch as an irradiation region of an irradiation surface of the phosphor element which is irradiated by a respective pump radiation source (e.g. after the peak width at half height), e.g. has a centroid which remains the same during the entire operation. The irradiation region can possibly be variable in terms of its size, but should in any case be fixed in terms of its position, certainly in a respective operating mode, e.g. for the entire operation; also provided is for the size to be constant.

In an embodiment, the first and the second pump radiation sources are of identical design and are operated with different output power for setting the inhomogeneity, for example amplitude and/or pulse width modulated. The output power of the first pump radiation source can thus be for example around at least 5%, 15% or 25% greater than that of the second one, wherein (notwithstanding the above) possible upper limits can be for example at most 300%, 200% or 100% (in each case with increasing preference in the order of mention). This may relate to laser diodes as pump radiation sources; a respective pump radiation source can also be made up of a plurality of laser diodes, whose respective laser beams are then combined, for example via a beam compression optical unit, and superposed (this is generally possible, even independently of the operation with different output power). Each pump radiation source may be the same as exactly one laser diode.

In an embodiment, the inhomogeneous illumination of the array is achieved or supported by the pump radiation traveling, upstream of the phosphor element, through a filter and/or by the illumination light traveling, downstream of the phosphor element, through a filter. Even though reference is primarily made here to "the filter," a combination of upstream and downstream arrangement is also expressly possible. The filter can be for example a gray filter, whose degree of filtering varies over the filter area (which supports the inhomogeneity). However, a color filter which spectrally changes the beam that passes therethrough is also possible; for example, it can also be a dichroic filter, which is transmissive in one wavelength range and reflective in another. Even in the case of the color filter/dichroic filter, filter properties that vary over the filter area are possible.

The filter can be applied for example directly adjoining the phosphor element (in direct optical contact therewith), that is to say for example depending on the arrangement upstream or downstream, on the area of incidence or of emission in the form of a coating. However, arrangement at a distance from the phosphor element is also possible, where the filter can then furthermore also be mounted displaceably (for "displaceable," cf. the disclosure below relating to the stop or the phosphor element). Depending on the operating state, the filter can in that case thus also be removed from the respective beam or from part thereof and, possibly, be replaced by a different filter, wherein the filters can, for example, also be part of a common filter wheel, that is to say not necessarily physically separate from one another.

In an embodiment, the inhomogeneous illumination of the array is achieved or supported by the pump radiation upstream of the phosphor element and/or the illumination light downstream of the phosphor element being reduced in terms of the beam cross section by a respective stop. Again, a combination of upstream and downstream arrangement is expressly possible, but for the sake of simplicity, reference will be made to "the stop" below. Using the stop it is possible in particular to realize the variant set out at the beginning, in which no illumination light at all is supplied to some of the micromirror actuators.

The stop may be displaceably mounted, with the result that the reduction of the beam cross section is also removable and/or variable. As in the case of a converging or diverging beam, a change can also be attained for example by way of a stop that is displaceable in the transmission direction. The stop may be movable at an angle to the transmission direction, e.g. perpendicular thereto, that is to say it can be moved into and out of the beam path. Also generally conceivable here is a stop wheel with which different shading profiles are stored for different operating states (in the form of a corresponding stop). Provided may be a stop that can be moved in and out and, in the latter case, is not replaced by a different stop, but releases the entire beam. A stop that is mounted displaceably in a straight line at an angle/perpendicular to the transmission direction, such as via a linear motor/actuator, may be provided.

In an embodiment, the inhomogeneous illumination is achieved or supported by a phosphor element being provided which is divided into at least two regions that differ in terms of their respective conversion properties. This division relates to a lateral direction that is at an angle to, preferably perpendicular to, the pump radiation direction of irradiation. The "pump radiation direction of irradiation" is obtained as an average of all direction vectors, along which pump radiation is incident on the phosphor element, wherein each direction vector is weighted with the associated radiant intensity during averaging. The lateral directions are perpendicular to a thickness direction of the phosphor element, and the latter has its planar extension in the lateral directions, that is to say for example in each of the lateral directions an extension that is greater than in the thickness direction, which is perpendicular thereto, by at least 5 or 10 times. A perpendicular pump radiation incidence may be provided, and the thickness direction and the pump radiation direction of irradiation in that case may correspondingly coincide.

As a consequence of the "different conversion properties," the illumination light emitted from a region of the phosphor element has a different spectral composition (in this respect, cf. the previous definition) with respect to the illumination light that is emitted from the other region. Generally, an average that is formed over the respective region is considered here, and e.g., the conversion properties are constant per region. The phosphor element can generally also exist in multiple parts, that is to say be made of a plurality of separate and physically separated parts. However, it is preferred for it to be in one piece, where the different regions thereof that differ, for example, in terms of conversion properties cannot be separated from one another in a destruction-free manner.

The "phosphor element" can generally be, for example, a transparent carrier having the phosphor thereon, wherein the phosphor may adjoin the carrier directly and/or forms a continuous layer; however, it can also generally be connected thereto via a joining connection layer, e.g. an adhesive layer. However, the phosphor element can also, for example, be a matrix material, for example a ceramic, glass, or a plastics material, in which the phosphor is arranged so as to be distributed over discrete regions, such as molded into grains of the ceramic or in particle form in glass/plastics. The phosphor element can furthermore also be a single crystal of the phosphor, such as a YAG:Ce single crystal. In the case of the above-discussed at least partial destruction, e.g. the single crystal, the matrix material or the carrier and/or the phosphor itself would in this case be locally separated.

Even if the phosphor element is in one piece, different regions thereof can still be optically decoupled from one another, wherein the regions can be decoupled for example by way of a partition (for example made of a reflective or absorptive material); however, decoupling can also be provided by way of a regional mechanical separation, for example in a phosphor layer of an overall multi-layered phosphor element (despite the configuration being in one piece overall).

Yttrium aluminum garnet doped with cerium (YAG:Ce) may generally be provided as a phosphor, e.g. for the generation of white light. For colored light, other phosphor systems can also be used, possibly in combination with a filter/filter wheel. Generally, "phosphor" can also be read on a mixture of a plurality of individual phosphors, of which one can be for example YAG:Ce. Independently of the specific configuration, the phosphor element can be operated in reflection (area of incidence and of emission coincide) or transmission (area of incidence and of emission are opposite one another).

The different conversion properties can be achieved for example by way of a difference in the phosphor in the regions, wherein if a plurality of individual phosphors are mixed, different proportions thereof in the respective mixture can already give rise to the difference. The mixtures can also differ, however, for example in at least one individual phosphor. Of course it is also possible for exactly one individual phosphor to be provided in one region, and for another one to be provided in the other region.

In an embodiment, the same phosphor is provided in the first and in the second region, but the regions differ in terms of the effective concentration of the phosphor. The "effective concentration" is the amount of phosphor through which the pump radiation actually travels per unit area, in other words, the volume concentration of the phosphor in one region can in fact deviate from that in the other region, and/or the phosphor element can have a different thickness in the regions.

In an embodiment (alternatively or additionally to the different effective concentration of the phosphor), the same scattering particles are provided in the regions of different conversion properties, but in different effective concentrations. It is possible with the different scattering particle concentrations to change for example the relative ratio of conversion light to pump radiation that has in part not been converted; conceivable scattering particles are, for example, titanium dioxide particles. With respect to the "effective concentration," reference is made to the preceding paragraph (volume concentration and/or thickness can differ).

In various embodiments, the inhomogeneous illumination of the array is achieved or supported by way of a phosphor element that has a gradient region. In this gradient region, the conversion properties change in one lateral direction along a gradient, i.e. the conversion properties have a stepless or smooth profile (within the meaning of differentiable). The gradient can here generally vary over the entire gradient region, but may be a constant gradient. The gradient can be set, for example, by a correspondingly changing effective concentration of the phosphor and/or of scattering particles, cf. the preceding paragraphs. Provided may be a phosphor element having a plurality of gradient regions, i.e. in which in each case the conversion properties vary with a respective gradient. Within a respective gradient region, a plurality of gradients can exist (in mutually tilted, e.g. perpendicular lateral directions).

In a configuration, the gradient region extends circumferentially about an axis that is parallel to the thickness direction of the phosphor element, and the conversion properties in the gradient region change along the directions that are radial with respect to this axis (each of these radial directions also coincides with a lateral direction, cf. the previous definitions). The conversion properties thus change radially outwardly away from said axis, and the degree of conversion can increase or decrease toward the outside. Such a gradient region can be, for example, round, e.g. annular or circular, e.g. annularly circular; an angled form is also possible, however.

Generally speaking, in addition to setting/supporting the inhomogeneous illumination, a phosphor element which is provided with different conversion properties can also help to correct or partially compensate for aberrations of an illumination optical unit, for example a peripheral falloff/ vignetting. Such aberrations or general defects can be present, for example, for different reasons in the illumination optical unit and in this way can be at least partially compensated for.

In a configuration, the conversion properties that change in the gradient region are attained by a corresponding change in the effective concentration of the phosphor, see above.

In an embodiment, the phosphor element is displaceably mounted, and its conversion properties differ in a first displacement position relative to the pump radiation unit from those in a second displacement position. As a consequence of the "displaceable" mounting, it is not necessary for the position of the entire phosphor element to be variable, and instead e.g. rotatable mounting is also possible, with the result that a rotational movement can be used to switch between the displacement positions. On the other hand, a displaceable mounting may be provided, e.g. with a displacement direction that is oriented at an angle to/perpendicular to the pump radiation direction of irradiance; provided may be a straight-line displaceability, for example operated using a linear motor/actuator. Displaceability along the pump radiation direction of the radiation would generally also be conceivable, wherein the irradiated region is changed (increased/decreased in size) in the case of a non-collimated (converging/diverging) beam.

Various embodiments also relates to the use of a projection lamp, described here, for illumination, e.g. for motor vehicle illumination, e.g. for exterior illumination; provided may be the use in a motor vehicle front headlight, e.g. in a car front headlight. During use, the micromirror actuators are illuminated inhomogeneously in at least one operating state, i.e. the array is supplied with pre-shaped illumination light. Reference is expressly made to all the statements made above, which are also deemed to have been disclosed as relating to the corresponding uses. However, use in effect light projection lamps or generally in the entertainment field or also for architainment illumination would generally also be conceivable.

FIG. 1a shows a simplified schematic illustration of a projection lamp according to various embodiments, having a pump radiation unit 1, in the present case a laser diode, a phosphor element 2, and a micromirror array 3. During operation, the pump radiation unit 1 emits pump radiation 4, in the present case blue light, which is incident on a surface of incidence 5 of the phosphor element 2. An optical unit arranged between the pump radiation unit 1 and the phosphor element 2, in the simplest case a collimation lens, possibly supplemented by a beam compression optical unit/ focusing optical unit, is not shown in the schematic illustration.

The phosphor element 2 has YAG:Ce as the phosphor, which emits yellow conversion light upon excitation with the pump radiation 4. Said conversion light is guided, together with pump radiation 4 which has partially not been converted, in the form of illumination light 7 to a surface of emission 6 of the phosphor element 2, situated opposite the surface of incidence 5, i.e. the phosphor element 2 is operated in transmission. The surface of incidence 5 and/or the surface of emission 6 can here in each case also have a dichroic coating, i.e. the first one transmissive for the pump radiation 4/reflective for the conversion light, and the second one in the reverse, but this is not shown here specifically (in the case of partial conversion, the surface of emission 6 is uncoated).

The illumination light 7 is guided over the micromirror array 3, with an illumination optical unit 8 being arranged downstream thereof. With respect thereto, the surface of emission 6 of the phosphor element 2 is imaged onto the micromirror array 3 using an optical unit (not illustrated). Illumination light 7 that has been reflected at different points of the micromirror array 3 is guided by the illumination optical unit 8 in different spatial directions (in the switched-on state of the respective micromirror actuator, cf. FIG. 1*b*). If the micromirror array is correspondingly switched, it is then thus possible to remove spatial directions or solid angle regions from the illumination in a targeted fashion, which permits adaptive street lighting, for example.

Figure 1B:
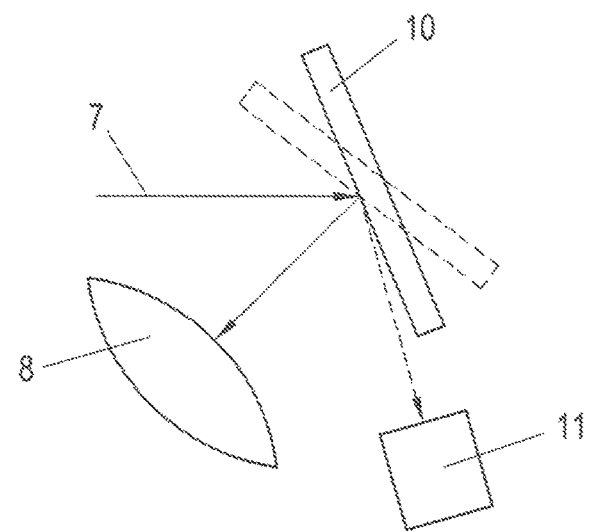
FIG. 1b shows a micromirror actuator of the micromirror array according to FIG. 1a in detailed view.

FIG. 1*b* shows a micromirror actuator 10 of the micromirror array 3 in a schematically enlarged view. The micromirror array 3 is made up of a plurality of such micromirror actuators 10, which are arranged in the form of a matrix. If the micromirror actuator 10 is in the switched-on state, it assumes a tilt position such that incident illumination light 7 is guided through the illumination optical unit 8 for the illumination use. In contrast, the micromirror actuator 10 in the switched-off state is tilted (indicated in dashed lines) such that the incident illumination light 7 is not guided through the illumination optical unit 8, but strikes an absorber 11 (i.e. is not used).

In order to reduce the amount of unused illumination light 7 that is destroyed in the absorber 11, for example, the micromirror array 3 in the projection lamp according to various embodiments is already illuminated inhomogeneously. That is to say, a pre-shaped light distribution is made available to the micromirror array 3, with the result that proportionally less illumination light 7 needs to be destroyed in the absorber 11. With respect to the effects and also variants of the pre-shaped light distribution, reference is expressly made to the introductory part of the description.

Various possibilities with which inhomogeneous illumination of the micromirror array 3 can be implemented will be shown below. The respective phosphor element 2 is here shown in each case in plan view (FIG. " . . . a") and in a section parallel to the thickness direction (FIG. " . . . b").

The phosphor element 2 according to FIG. 2 is divided into an inner first region 2*a* and an outer second region 2*b*. The effective phosphor concentration is greater inside the inner region 2*a*, which, for identical volume concentration of the phosphor, is achieved via a greater thickness in the region 2*a*. As a result, the degree of doping with cerium is greater in the first region 2*a*, i.e. in part more pump radiation 4 is converted/more conversion light is emitted here.

In contrast to the phosphor element 2 according to FIG. 2, the basic shape of that of FIG. 3, as viewed in plan view, is round and not rectangular or square. In addition, the inner region 2*a* is thinner, which is why the effective phosphor concentration is lower here. The illumination light 7 emitted from the region 2*a* thus has a greater blue component (less conversion), which may be of interest for example for a high-beam function. Additionally or alternatively to the variation of the phosphor concentration, a difference could also be achieved for example by differing effective concentrations of scattering particles, such as titanium dioxide particles.

The phosphor element 2 according to FIG. 4 is divided into three regions 2*a, b, c*, which in turn nest inside one another. The effective phosphor concentration (the cerium proportion which is effectively "seen" by the pump radiation 4) is greatest in the first region 2*a*, i.e. substantially yellow illumination light 7 is emitted from here (hardly any blue component). The region 2*b*, which follows next toward the outside, is considerably thinner (cf. FIG. 4*b*), and as a result the effective phosphor concentration is less and thus the transmitted blue component is greater. The effective phosphor concentration in the third region 2*c* is between that of the first region 2*a* and of the second region 2*b*.

The phosphor element 2 according to FIG. 5*a*, FIG. 5*b* is not divided into a plurality of regions, but here the conversion properties change along a gradient over the entire phosphor element 2. The effective phosphor concentration decreases toward the bottom in FIG. 5*a*, which is why the blue component increases toward the top, indicated by the arrow. The corresponding profile of the phosphor concentration can be established, for example, by way of a volume concentration that increases over the entire phosphor element 2.

The phosphor element 2 according to FIG. 6*a*, FIG. 6*b* is divided into two gradient regions 2*d, e*, which each extend circumferentially about an axis 60, wherein the gradient is formed with respect to the directions that are radial to the axis 60. In both gradient regions 2*d, e*, the effective phosphor concentration decreases toward the outside, and the blue component correspondingly increases toward the outside, wherein the degree of conversion in the outer gradient region 2*e* is generally higher (on average) and the gradient is also greater here.

The phosphor element 2 according to FIG. 7*a*, FIG. 7*b* has a thick inner region 2*a* with constant conversion properties and a high yellow component (cf. FIG. 4*a*, FIG. 4*b*), which is followed toward the outside by two circumferential gradient regions 2*d, e*; to this extent, reference is also made to the description with respect to FIG. 6*a*, FIG. 6*b*.

The phosphor element 2 according to FIG. 8 is partially shaded by a stop 80 (shown in plan view according to FIG. 8*a*), wherein the stop 80 is mounted displaceably at an angle to a direction of incidence of the pump radiation 4, i.e. the degree of shading can be changed, as a result of which differently pre-shaped light distributions (for the illumination of the micromirror array) are settable. The section according to FIG. 8*b* is located in the part of the phosphor element 2 that is at the bottom in FIG. 8*a*. The phosphor element is divided into a gradient region 2*d*, in which the blue component increases toward the right-hand side, and two regions 2*a, b*, over which the conversion properties are constant in each case, wherein the effective phosphor concentration in the region 2*b* is less (set via deviating volume concentration and/or thickness).

The phosphor element 2 according to FIG. 9*a*, FIG. 9*b* overall is mounted movably relative to the pump radiation unit 1, as a result of which different illumination light can be set depending on the position of the phosphor element 2, because the conversion properties in the gradient regions 2*d, e* change (blue component increases toward the top). In both gradient regions 2*d, e*, the blue component varies along the movement direction, and in the gradient region 2*e* it additionally also varies perpendicular thereto (increases toward the right-hand side).

Figure 10A:
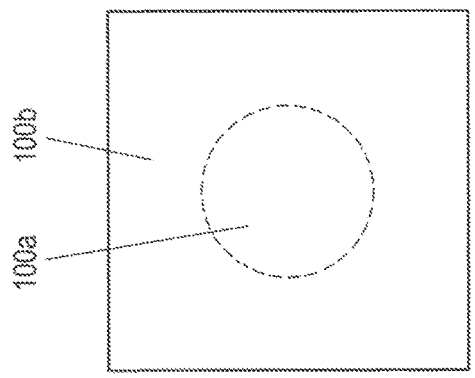
Figure 10B:

The phosphor element 2 according to FIG. 10*a*, FIG. 10*b* is provided with homogeneous conversion properties which are constant over the entire phosphor element 2, wherein an illumination light emission that varies over the surface of emission (and thus inhomogeneous illumination of the micromirror array 3) is achieved via inhomogeneous irradiation with the pump radiation. In plan view according to FIG. 10*a*, an inner region 100*a* is marked, in which the irradiance is greater than in the outer region 100*b*. It could also be possible for a phosphor element 2, which is divided into different regions according to one of the previous figures, to be irradiated correspondingly inhomogeneously, i.e. for example the first region 2*a* could be irradiated with greater irradiance than the second region 2*b* in the phosphor element according to FIG. 3*a*, FIG. 3*b*.

Figure 11A:
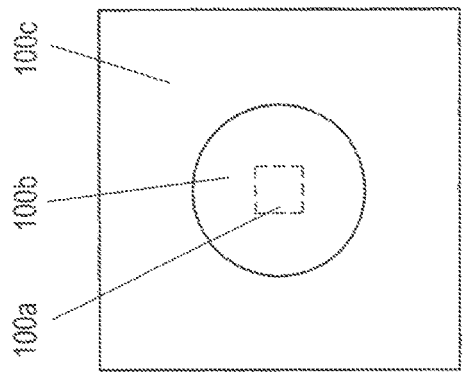
Figure 11B:
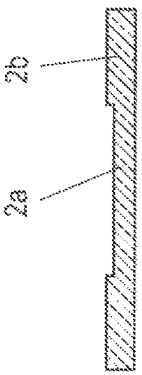

FIG. 11a, FIG. 11b illustrate such a combination, where the regions of different irradiance 100a to c are illustrated in plan view (FIG. 11a), whereas the division of the phosphor element 2 into the regions 2a, b is illustrated by the section (FIG. 11b). Rectangular irradiation can be implemented for example by imaging a rectangular LED onto the phosphor element 2, but also using a stop/a filter. The effective phosphor concentration is lower, and the blue component is correspondingly greater, in the first region 2a. The second region 2b (with a lower blue component) is irradiated with an irradiance (region 100c), which is greater in contrast to the irradiance in the region 100b. The irradiance is highest in the innermost region 100a.

LIST OF REFERENCE SIGNS pump radiation unit 1
phosphor element 2
regions of the phosphor element 2a-e
micromirror array 3
pump radiation 4
surface of incidence 5
surface of emission 6
illumination light 7
illumination optical unit 8
micromirror actuator 10
absorber 11
axis 60
stop 80
regions of different irradiance
of the phosphor element 100a-c
inner region 100a
outer region 100b While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A projection lamp for illumination, comprising:
   a pump radiation unit configured to emit pump radiation;
   a phosphor element for the at least partial conversion of the pump radiation into a conversion light;
   a micromirror array having a multiplicity of micromirror actuators which are arranged in the form of a matrix;
   a filter arranged upstream or downstream from the phosphor element to where the pump radiation or an illumination light passes therethrough;
   wherein the projection lamp is set up such that, during operation, the phosphor element is irradiated by the pump radiation from the pump radiation unit, wherein the conversion light which is thereupon emitted by the phosphor element at least partially makes up the illumination light, which illumination light is guided for adjusting a light distribution over the micromirror actuators,
   wherein the micromirror actuators are illuminated inhomogeneously with the illumination light at respective times to support the light distribution that is adjusted using the micromirror array.

2. The projection lamp of claim 1,
wherein the illumination light is guided only over some of the micromirror actuators in the respective time points, that is to say others of the micromirror actuators are unilluminated, which at least supports the inhomogeneous illumination of the micromirror actuators.

3. The projection lamp of claim 1,
wherein at the respective time points, a first plurality of the micromirror actuators is illuminated with a first part of the illumination light and a second plurality of the micromirror actuators is illuminated with a second part of the illumination light, wherein the first and the second part of the illumination light have different spectral compositions, which at least supports the inhomogeneous illumination of the micromirror actuators.

4. The projection lamp of claim 1,
wherein at the respective time points, a first plurality of the micromirror actuators is illuminated with a first part of the illumination light that, on the micromirror array, has a first irradiance, and a second plurality of the micromirror actuators is illuminated with a second part of the illumination light that, on the micromirror array, has a second irradiance, wherein the first and the second irradiance differ, which at least supports the inhomogeneous illumination of the micromirror actuators.

5. The projection lamp of claim 1,
wherein the pump radiation strikes a surface of incidence of the phosphor element and generates an inhomogeneous irradiance distribution on the surface of incidence, which at least supports the inhomogeneous illumination of the micromirror actuators.

6. The projection lamp of claim 1,
wherein the pump radiation unit has a plurality of pump radiation sources, wherein at the respective time points, a first one of the pump radiation sources emits a first part of the pump radiation with a first radiation density, and a second one of the pump radiation sources emits a second part of the pump radiation with a second radiation density, wherein the first and the second radiation densities differ, which at least supports the inhomogeneous illumination of the micromirror actuators.

7. The projection lamp of claim 6,
wherein the first and the second pump radiation sources are of identical design, but are operated at the respective time points with different output power.

8. The projection lamp of claim 1,
wherein at least one of the pump radiation is delimited by a stop upstream of the phosphor element or the illumination light is delimited by a stop downstream of the phosphor element, i.e. a beam cross section of the respective beam is reduced, which at least supports the inhomogeneous illumination of the micromirror actuators.

9. The projection lamp of claim 1,
wherein the phosphor element has, with respect to a lateral direction that is at an angle to a pump radiation direction of irradiation, a first region and a second region that differs from the first, wherein the first region and the second region differ in terms of their conversion properties.

10. The projection lamp of claim 9,
wherein the same phosphor is provided and/or the same scattering particles are provided in the first region and the second region, but at least one of the effective concentration of the phosphor differs in the first region and the second region or the effective concentration of the scattering particles differs in the first region and the second region.

11. The projection lamp of claim 1,
wherein the phosphor element has a gradient region, wherein the conversion properties vary along a lateral direction, which is at an angle to the pump radiation direction of irradiation, with a gradient, which at least supports the inhomogeneous illumination of the micromirror actuators.

12. The projection lamp of claim 11,
wherein the gradient region extends circumferentially about an axis that is perpendicular to the lateral direction, and the conversion properties in the gradient region vary along the directions that are radial with respect to said axis with a gradient.

13. The projection lamp of claim 11,
wherein the change in conversion properties is achieved by way of a varying effective concentration of a phosphor.

14. The projection lamp of claim 1,
wherein the phosphor element is displaceably mounted such that the conversion properties of the phosphor element in a first displacement position with respect to the pump radiation unit differ from those in a second displacement position with respect to the pump radiation source.

15. A projection lamp for illumination, comprising:
a pump radiation unit configured to emit pump radiation;
a phosphor element for the at least partial conversion of the pump radiation into a conversion light; wherein the phosphor element comprises a first region and a second region where the first region and second region differ in phosphor concentration;
a micromirror array having a multiplicity of micromirror actuators which are arranged in the form of a matrix;
wherein the projection lamp is set up such that, during operation, the phosphor element is irradiated by the pump radiation from the pump radiation unit, wherein the conversion light which is thereupon emitted by the phosphor element at least partially makes up an illumination light, which illumination light is guided for adjusting a light distribution over the micromirror actuators,
wherein the micromirror actuators are illuminated inhomogeneously with the illumination light at respective times to support the light distribution that is adjusted using the micromirror array.

16. The projection lamp of claim 15,
wherein the first region and the second region of the phosphor element differ in thickness.

* * * * *